Oct. 3, 1967  A. B. MACQUARRIE ETAL  3,344,728
PHOTOGRAPHIC DOCUMENT COPYING APPARATUS
Original Filed Aug. 23, 1961  7 Sheets-Sheet 1

INVENTORS
Allen B. MacQuarrie
BY Archur J. Sable
Brown and Mikulka
Robert E. Carl
ATTORNEYS Oct. 3, 1967    A. B. MACQUARRIE ETAL    3,344,728
PHOTOGRAPHIC DOCUMENT COPYING APPARATUS
Original Filed Aug. 23, 1961    7 Sheets-Sheet 4

FIG. 5

INVENTORS
Allan B. MacQuarrie
Arthur J. Sable
BY Brown and Mikulka
Robert E. Corb
ATTORNEYS Oct. 3, 1967   A. B. MACQUARRIE ETAL   3,344,728
PHOTOGRAPHIC DOCUMENT COPYING APPARATUS
Original Filed Aug. 23, 1961   7 Sheets-Sheet 5

INVENTORS
Allan B. MacQuarrie
Arthur J. Sable
BY Brown and Mikulka
and
Robert E. Carb
ATTORNEYS Oct. 3, 1967  A. B. MACQUARRIE ETAL  3,344,728
PHOTOGRAPHIC DOCUMENT COPYING APPARATUS
Original Filed Aug. 23, 1961  7 Sheets-Sheet 7

INVENTORS
Allan B. MacQuarrie
Arthur J. Sable
BY Brown and Mikulka
and Robert E. Cork
ATTORNEYS

United States Patent Office 3,344,728
Patented Oct. 3, 1967

3,344,728
PHOTOGRAPHIC DOCUMENT COPYING APPARATUS
Allan B. Macquarrie, Needham, Mass., and Arthur J. Sable, Saratoga, Calif., assignors to Polaroid Corporation, Cambridge, Mass., a corporation of Delaware
Continuation of application Ser. No. 133,482, Aug. 23, 1961. This application July 1, 1964, Ser. No. 379,681
2 Claims. (Cl. 95—75)

ABSTRACT OF THE DISCLOSURE

A manually operated photographic copying apparatus is disclosed having an electrically operated light source for exposing a photosensitive sheet during movement of the sheet relative to the light source. The manual operation of the apparatus provides the drive means for moving the photosensitive sheet and for driving a generator coupled with the light source and in parallel with a Zener diode connected to ground for short circuiting the generator output when the rate of advancement of the photosensitive sheet and the potential of the generator output reach a predetermined level whereby the generator acts as a governor.

---

This invention relates to photographic apparatus, and, more particularly to photographic apparatus for making copies of original documents.

This application is a continuation of the copending application of Allan B. Macquarrie et al., Ser. No. 133,482, filed Aug. 23, 1961, now abandoned.

A complete photographic document copying apparatus generally comprises means for exposing a photosensitive image recording material in conjunction with an original to produce an image of the original and means for treating the exposed image recording material to produce a copy of the original. In document copying devices of the type with which the present invention is concerned, the image recording material is in the form of a sheet comprising a support carrying a layer of a photosensitive material such as silver halide. An area of the photosensitive sheet is exposed in conjunction with the original and is then subjected to a process involving the distribution of a fluid in contact with the photosensitive material. The apparatus of the invention is designed to produce a positive copy by a "dry" process, so-called because the fluid is confined between the photosensitive sheet and a second sheet, superposed with the photosensitive sheet following exposure thereof. Additional features common to most document copying apparatus of this type include means for feeding an original into the apparatus, superposing it with the photosensitive sheet during exposure of the photosensitive sheet, separating the original from the photosensitive sheet and feeding it from the apparatus, exposing the photosensitive sheet, superposing the photosensitive sheet with a second sheet, distributing a processing fluid between the sheets to form a sandwich in which the copy is produced, and advancing the sheets through the apparatus.

In the copending U.S. application of Edwin H. Land, Nicholas Gold and Arthur J. Sable, Ser. No. 133,397, filed Aug. 23, 1961, now patent No. 3,152,531, there is shown a document copying apparatus of the foregoing type designed to be manually operated and including a generator for supplying current to operate a lamp which functions to expose the photosensitive material. Operation of the apparatus is entirely manual and is completely independent of any source of power (including electricity), except for a manual force imparted by the operator for advancing the various sheet materials through the apparatus during exposure and processing, and for operating the generator to power the lamp which provides light for exposing the photosensitive materials. In addition to a generator, this apparatus includes a governor for regulating the speed of movement of the sheets through the apparatus and thereby controlling the duration of both exposure and processing; and for controlling the speed of the generator so as to regulate its current output and, hence, lamp brightness.

An object of the invention is to provide, in a manually operated photographic document copying apparatus of the type described, a generator for supplying current for operating a lamp for exposing a photosensitive image recording sheet material, which generator also functions as an electromagnetic governor for regulating its own speed and the speed of movement of the sheet material through the apparatus.

Other objects of the invention are to provide, in photographic document copying apparatus of the type described, an electrical generator which develops a potential proportional to the speed at which the generator is operated and means connected in series with the generator output constituting a very high resistance to the flow of electrical current when the potential across the generator output is less than a predetermined voltage, and offering substantially no resistance to the flow of current as long as the potential across the generator output exceeds the predetermined voltage; and to provide apparatus, as described, wherein a Zener diode is connected in series with the generator output and in parallel with the lamp connected to the generator and providing light for exposing the photosensitive image recording material.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Reference is now made to FIGS. 1 through 8 wherein there is illustrated one form of photographic document copying apparatus embodying the invention. This apparatus comprises a housing, designated 10, for mounting and enclosing the components of the apparatus. Housing 10 comprises an upper housing section 12 and a lower housing section 14 pivotally secured to one another at a hinge 16 located at one end (termed the rear end) of the housing. The two housing sections are pivotable between the closed or operative position shown in FIGS. 1 through 3, in which the components of the apparatus are in operative relation, and the open or inoperative position shown in FIG. 4, in which the two housing sections are located apart from one another to permit loading of photographic materials into the apparatus in preparation for use.

Upper housing section 12 includes an upper wall 18 including means defining an inlet passage 20 and exit passage 22 through which an original document to be copied can be, respectively, introduced into and fed from the apparatus. Inlet passage 20 is defined by convergent walls designated, for purposes of description, as a forward wall 24, a rear wall 26 and side walls 28. Exit passage 22 is similarly defined by a forward wall 30, rear wall 32 and side walls 34. The housing sections include portions defining a withdrawal opening 36 at the forward end of the housing through which photographic sheet materials, including copies produced by the apparatus, are withdrawn from the housing. Withdrawal opening 36 is defined by a forward end wall 38 on lower housing section 14 and a forward end wall 40 on upper housing section 12. Forward end wall 38 extend upwardly at an angle toward the front of the housing and forward end wall 40 extends downwardly at an angle toward the front of the housing at an angle toward the rear of the housing where the lower edge of forward end wall 40 cooperates with the upper edge of forward end wall 38 to define withdrawal opening 36.

Housing 10 includes upper side walls 42 on upper housing section 12 and lower side walls 44 on lower housing section 14. Lower housing section 14 also includes a bottom wall 46 on which are mounted feet 48 which serve to support the apparatus, and which are preferably formed of a material, such as rubber, having a high coefficient of friction for preventing the apparatus from sliding on the surface on which it is supported during use.

The operative components of the document copying apparatus are mounted on support members or chassis carried within housing 10 on the upper and lower housing sections. These support members include a lower chassis or frame 50 comprising a base plate 52 and side plates 54 and 56 extending upwardly from the base plate which rests on bottom wall 46 of lower housing section 14. An upper chassis or frame 58 is provided comprising side plates 60 and 62 which may be joined by connecting rods 64. Side plates 54 and 56 are provided with hinge extensions 66 and side plates 60 and 62 are similarly provided with hinge extensions 68. The hinge extensions of the upper and lower chassis or frames are pivoted at hinge 16 on a common hinge pin 70. Upper chassis 58 is secured within upper housing section 12 so that the upper chassis and housing section pivot together about hinge pin 70.

The apparatus includes an intermediate chassis or frame 72 comprising a pair of arms 74 pivotally mounted adjacent their ends on side plates 54 and 56 adjacent the forward ends of the side plates. Arms 74 are pivotally mounted at studs 76 secured in side plates 54 and 56 so that intermediate chassis 72 may be pivoted between the operative position, shown in FIG. 3, to the inoperative position of FIG. 4 which permits loading of photographic materials into the apparatus.

The document copying apparatus of the invention is designed to produce copies of original documents by a photographic process involving the exposure of a photosensitive sheet and the treatment of the exposed photosensitive sheet with a fluid to produce a transfer image in a second or image-receiving sheet which is superposed with the exposed photosensitive sheet during treatment of the latter. The photosensitive sheet, herein designated 77, preferably comprises a photosensitive silver halide carried on a suitable support. The silver halide may be in the form of a gelatin emulsion and the support may comprise any of the conventional film base materials, paper being preferable because of its inexpensiveness. Exposure of the photosensitive material may be of one of two different types, i.e., "reflex" or "direct." "Direct" exposure of the photosensitive material involves exposure of the silver halide to light transmitted through the original to the photosensitive material, and is useful when the original has subject matter on only one surface and the material comprising the original is transmissive to light actinic to the photosensitive material. When the original has subject matter on both sides or is not transmissive to actinic light, then "reflex" exposure is used and this involves transmitting the actinic light through the photosensitive sheet to the surface (to be copied), of the original which reflects some of the light back to the photosensitive material further exposing the photosensitive material to form a developable image therein.

Following exposure, the photosensitive material is treated with a fluid in conjunction with a second or image-receiving sheet, herein designated 78, superposed with the photosensitive sheet to form a transfer image on the image-receiving sheet. Image formation is effected by a silver halide diffusion transfer-reversal process distinguished by the fact that it is an essentially dry process, in which the fluid effecting the processing is confined between the sheets, obviating the necessity for tanks of fluid in which the sheets are immersed.

In this type of photographic transfer process, the photosensitive and second sheets are superposed and a fluid is distributed between the sheets by advancement of the superposed sheets in superposition between a pair of pressure-applying members. The two sheets are retained in superposition for a predetermined period during which a silver halide developer in the processing fluid reduces exposed silver halide to silver and unexposed silver halide is converted to a soluble complex which is transferred by diffusion to the image-receiving sheet where it is reduced to silver to form a positive transfer image. The image-receiving sheet may include an image-receptive layer carried on a suitable support such as paper, or it may function as a support for a layer in which an image is formed.

For examples of processes of this type and materials useful therein, reference may be had to U.S. Patents Nos. 2,543,181, issued Feb. 27, 1951 and 2,662,822, issued Dec. 15, 1953, both in the name of Edwin H. Land.

The apparatus comprises means for holding a supply of photosensitive sheet 77, preferably in the form of an elongated web or strip of sufficient length to make a large number of copies. This means comprises a conventional spool 80 and means on side plates 54 and 56 of lower chassis 50 for mounting the spool at its ends for pivotal movement between the side plates within the rearmost portion of housing 10. An important advantage of providing a continuous photosensitive sheet, in a light-free environment, for a plurality of copies, resides in the fact that the photosensitive material can be fairly "fast" as compared to the usual document copying material which is handled in the light and is required to be relatively insensitive. Arms 74 of intermediate chassis 72 are provided with means for mounting a second spool 82 on which is coiled a supply of image-receiving sheet 78 substantially equal in length and width to photosensitive sheet 77. The supply of second sheet 78 on spool 82 is enclosed within housing 10 at the forward end of the housing.

The document copying apparatus of the invention includes means for subjecting the photosensitive material to both reflex and direct types of exposures. The exposure means comprises two sources of illumination and means for conducting the photosensitive sheet and an original in superposition past the sources of illumination to effect exposure of the photosensitive sheet. The use of a highly sensitive image-recording material obviates the need for the usual high-intensity light sources normally associated with document copying apparatus. The sources of illumination are essentially the same, and each comprises an elongated bar or rod 84 of a transparent material such as glass or an organic plastic. Bar 84 is substantially circular in cross section, is at least equal in length to the width of the photosensitive sheet material, and is provided with a polished surface throughout, so that the bar functions to conduct light from a source at one end toward its other end. Bars 84 are each enclosed in a cylindrical tube 86 formed of a material such as metal, which is opaque to light actinic to the photosensitive material and is provided with an axial slot 88 at least equal in length to the width of the photosensitive sheet for transmitting light emitted from bar 84. One of the sources of illumination is mounted on upper housing section 12 and the other is mounted on lower housing section 14, and the photosensitive sheet and original are guided in superposition between the two sources of illumination so that the photosensitive sheet may be subjected to either a reflex or direct exposure. One of tubes 86 is mounted at one end in side plate 56 with its other end sections, designated 90, extending through an opening in side plate 54. The other tube 86 is similarly mounted with one end secured in side plate 62 and its other end section 90 extending through an opening in side plate 60.

The sources of illumination are in the form of incandescent lamps 92, each mounted within end section 90 of a tube 86 adjacent the end of the bar 84 contained within the tube. Each lamp 92 is shown mounted in a reflector 94 carried on end cap 96 secured to end section 90 of the tube. Tubes 86 and bars 84 contained therein are mounted with their axes substantially parallel and with slots 88 facing one another. The cylindrical surface of each of bars 84 is provided with a roughened or scratched area extending lengthwise of the bar and covering a longitudinal portion of the cylindrical surface disposed opposite the slot 88 of the tube 86 in which the bar is enclosed. This roughened surface functions as a diffusing reflector for reflecting light transmitted by the bar from lamp 92 radially through the slot in the tube. In order to insure uniformity of light emitted by each bar throughout the length of the slot through which the emitted light is transmitted, the area of the roughened or scratched surface portion varies in its angular dimension from end to end of the bar, this area being smaller at the end closest the lamp and larger at the end furthest from the lamp. The roughened areas of the bars are shown as being made up of a plurality of axial scratches or grooves of varying lengths.

The guide means of the invention includes a cylindrical tube 98 formed of a material such as glass or organic plastic capable of transmitting light actinic to the photosensitive material. Tube 98 has an inside diameter greater than the outside diameter of tube 86 and is mounted in surrounding relation to the tube 86 which is mounted on upper chassis 58. A pair of elongated guide rolls 100 and 102 are provided mounted for rotation on and intermediate side plates 54 and 56. Guide rolls 100 and 102 are positioned with their axes substantially parallel with one another and with the axes of bars 84 and tubes 86, and are located for engaging tube 98 at positions spaced from one another around the periphery of the cylindrical surface of tube 98. A backing roll 104 is provided mounted for rotation on and intermediate side plates 60 and 62 in position for urging tube 98 against guide rolls 100 and 102.

Photosensitive sheet 77 is conducted from spool 80 between guide roll 100 and tube 98 around a portion of the cylindrical surface of tube 98 and between guide roll 102 and tube 98. Slots 88 in tube 86 are positioned for transmitting light from bars 84 for exposing the portion of the photosensitive sheet supported by tube 98 intermediate guide rolls 100 and 102, and the sources of illumination are designed to be used selectively and one at a time for exposing the photosensitive sheet as it is advanced around the portion of tube 98 between guide rolls 100 and 102 past slots 88 in tubes 86.

Figure 1:
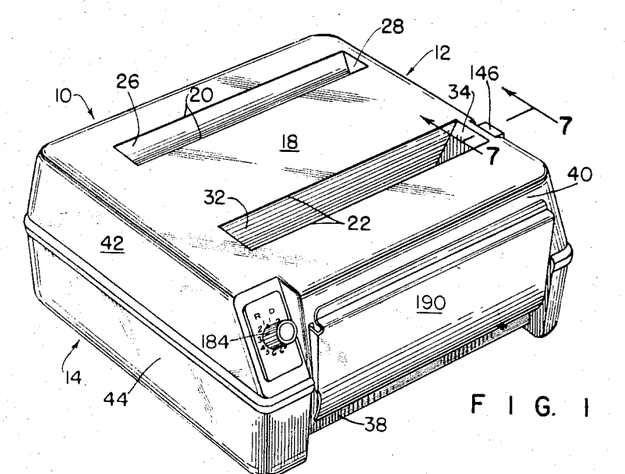
FIGURES 1 and 2 are perspective views of document copying apparatus embodying the invention.
Figure 2:
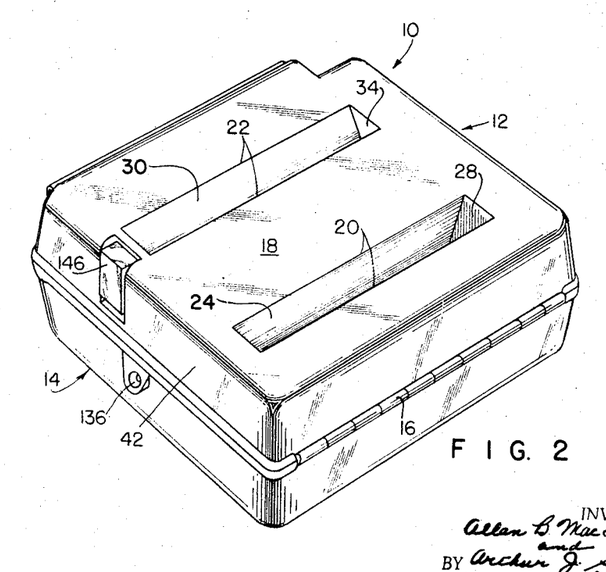
Figure 3:
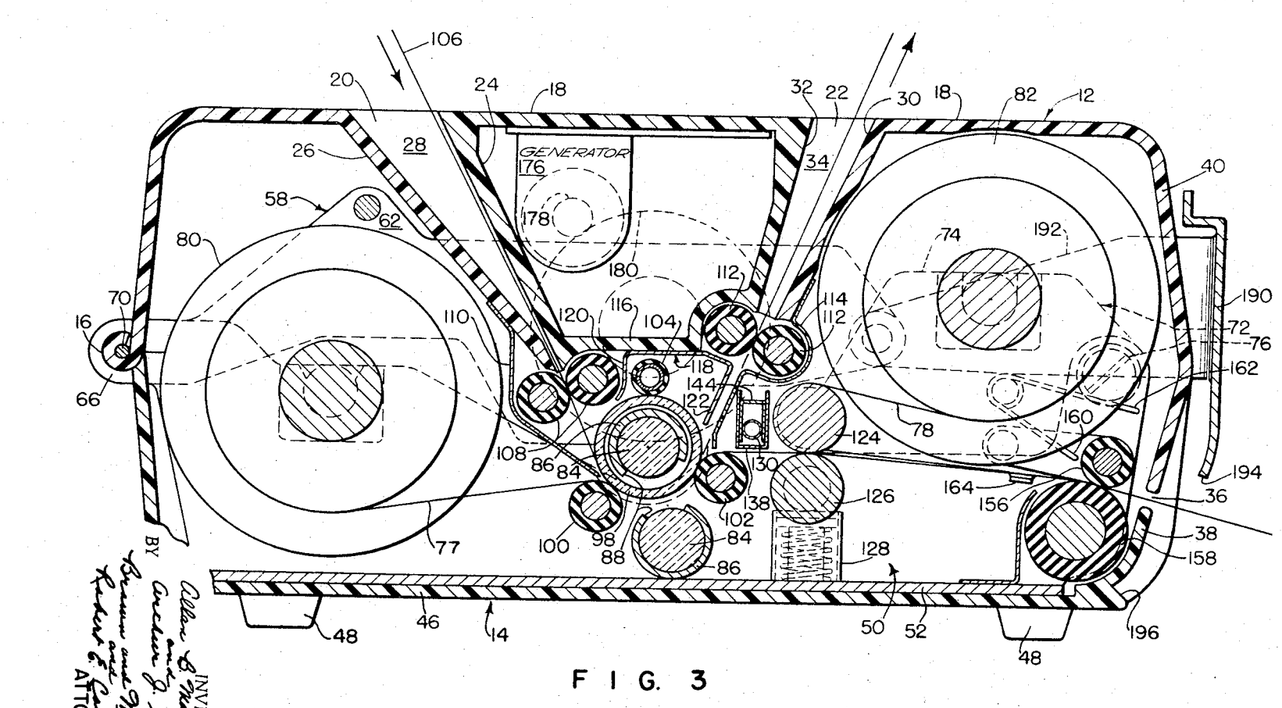
FIG. 3 is a sectional view of the apparatus of FIGS. 1 and 2, the section being taken along a plane substantially midway between the sides of the apparatus.

During exposure of photosensitive sheet 77, an original document, designated 106 in FIG. 3, is superposed with the photosensitive sheet between the latter and tube 98. The original is introduced through passage 20 and means are provided for sealing the passage against the admission of light and guiding and feeding the original into superposition with photosensitive sheet 77 at the bite of guide roll 100 and tube 98. In the form shown, this light-sealing and feeding and guiding means comprise a pair of inlet feed rolls 108 mounted for rotation in juxtaposition with their axes substantially parallel, within housing 10, on and between side plates 60 and 62. Inlet feed rolls 108 include resiliently deformable surfaces and are positioned with the bite of the feed rolls located in alignment with the inner end of passage 20 in position for engaging original 106 and advancing the original toward the bite of tube 98 and guide roll 100. The inlet feed rolls engage the original along a line lying in a plane substantially tangent to the surface of tube 98 at a line at least closely adjacent the line of contact between tube 98 and guide roll 100. At least one of inlet feed rolls 108 is driven for advancing original 106 through passage 20 into the bite of tube 98 and guide roll 100 between the tube and photosensitive sheet 77. A lightsealing element 110 is provided dependent from rear wall 26 and extending downwardly to the rear of the rearmost inlet feed roll 108 and forwardly to a position adjacent the bite of tube 98 and guide roll 100 for insuring against exposure of the photosensitive sheet to light transmitted through passage 20.

As a means for feeding original 106 from the housing through passage 22 following exposure of the photosensitive sheet in superposition with the original, there are provided a pair of outlet feed rolls 112 mounted for rotation in juxtaposition and with their axes parallel on and between side plates 60 and 62. The construction of outlet feed rolls 112 is similar to that of inlet feed rolls 108 and the outlet feed rolls are positioned with the bite of the rolls located at the inner end of exit passage 22 in position for engaging the original along a line lying in a plane substantially tangent to both tube 98 and guide roll 102. The document copying apparatus is designed for copying originals which are substantially flat and tend to assume a planar configuration so that as an original 106 is advanced from between the bite of tube 98 and guide roll 102, the leading edge of the original tends to move in a plane tangent to tube 98, guide roll 102 and outlet feed rolls 112 so as to enter the bite of the outlet feed rolls and become engaged thereby. At least one of the outlet feed rolls is driven for advancing the original from the housing through exit passage 22. Additional light-sealing means are provided for exit passage 22 and, in the form shown, comprise a light-sealing element dependent from forward passage wall 30 extending around the forewardmost outlet feed roll 112 to a position adjacent guide roll 102. Light-sealing element 114 performs the additional function of aiding in guiding the leading end of the original from between tube 98 and guide roll 102 into the bite of outlet feed rolls 112. The housing includes an inner wall 116 extending between forward passage wall 24 and rear passage wall 32. Mounted on inner wall 116 is a light-sealing element 118 having a first dependent portion 120 extending downwardly between the forewardmost inlet feed roll 108 and tube 98 and a second dependent portion 122 extending downwardly from a position adjacent the rearmost outlet feed roll 112 to a position adjacent tube 98. Second dependent portion 122 cooperates with the lower portion of light-sealing element 114 to provide a passage for guiding the original from between tube 98 and guide roll 102 into the bite of outlet feed rolls 112.

As previously noted, the exposed photosensitive sheet 77 is processed to produce a positive copy of the original by superposing the photosensitive sheet with a second or print-receiving sheet 78 and distributing a processing fluid between the superposed sheets to form a sandwich. The means in the apparatus of the invention for performing this processing comprise a pair of pressure-applying rolls 124 and 126, roll 124 being mounted for rotation on intermediate chassis 72 and roll 126 being mounted on lower chassis 50 so that the axis of the rolls lie in substantially a common plane when the apparatus is in the operative position shown in FIG. 3. Rolls 124 and 126 are located adjacent guide roll 102, and roll 126 is mounted for limited movement toward and away from roll 124, spring means 128 being provided for biasing roll 126 toward roll 124. Photosensitive sheet 77 extends from between tube 98 and guide roll 102 between rolls 124 and 126 and image-receiving sheet 78 is conducted from spool 82 around roll 124 into superposition with the photosensitive sheet between rolls 124 and 126. Mounting of spool 82 and pressure-applying roll 124 on intermediate chassis 72 permits the photosensitive and image-receiving sheets to be threaded in superposition between the pressure-applying rolls.

In the form of document copying apparatus shown, the processing fluid for each exposed area of the photosensitive sheet is provided on the photosensitive sheet in the form of an elongated mass extending from side to side of the exposed area of the sheet near the leading edge of the exposed area, that is, on the portion of the photosensitive sheet extending between guide roll 102 and the bite of pressure-applying rolls 124 and 126. Advancement of the photosensitive and second sheets in superposition between the pressure-applying rolls causes this mass of fluid to be distributed between the sheets toward the trailing end of the exposed area of the photosensitive sheet. It is contemplated that the processing fluid required for each exposed area of the photosensitive sheet, in order to produce a positive copy on the image-receiving sheet, will be supplied in an elongated tubular container very much like a conventional drinking straw. This container, designated 130 in FIG. 9, includes a cavity of substantially uniform cross section approximately equal in length to the width of the exposure area of the photosensitive sheet and filled with the processing fluid. Both ends of the container are sealed to prevent escape of the fluid and the admission of air into the container, and one end, termed the trailing end and designated 132, is constructed so as to become unsealed in response to the generation of hydraulic pressure within the fluid, to form a discharge mouth preferably equal in area to the cross sectional area of the fluid-filled cavity through which the fluid contents of the container are discharged. Containers of this type, their construction and function are described in detail in U.S. Patent No. 3,047,387, issued July 31, 1962 to Edwin H. Land.

The apparatus includes means permitting the container to be introduced into the apparatus so that it extends across and adjacent the portion of photosensitive sheet 77 extending between guide roll 102 and the bite of the pressure-applying rolls. This means comprises a tapered opening 136 in lower side wall 44. Mounted within the housing in alignment with opening 136 is a channel-shaped guide member 138 which extends from the tapered opening into the housing past the edge of the photosensitive sheet for supporting and guiding container 130 into the housing into a position extending across and adjacent the photosensitive sheet. The container is introduced into the housing until leading end 134 is located adjacent the margin of the photosensitive sheet furthest from opening 136 and the leading end of the fluid-filled cavity is located adjacent the lateral edge of the exposure area. The container is then compressed at a position in the region of the edge of the exposed area closest opening 136 and simultaneously withdrawn from the apparatus through opening 136. This causes the leading end of the container to become unsealed and the fluid contents of the container to be ejected therefrom in the form of a uniformly distributed elongated mass extending across the portion of the photosensitive sheet extending between guide roll 102 and the pressure-applying rolls.

Means are provided for compressing the container, as described, during its withdrawal in order to cause ejection of the fluid from the container. This means comprises a turned up curved lip 140 on guide member 138 and a corresponding juxtaposed lip 142 on the end of a channel-shaped pressure member 144 mounted for limited pivotal movement inside guide member 138 in such a way that the guide member and pressure member cooperate to form a tube through which the straw-shaped pod is introduced and withdrawn. A manually operable push button 146 mounted in a recess in upper wall 18 and side wall 42 is provided for pivoting pressure member 144 so that lip 142 is urged toward lip 140 to apply compressive pressure to the container. Push button 146 actuates a plunger rod 148 supported for axial movement in a bracket 150 extending inwardly from upper side wall 42. A spring arm 152 is connected to the inner lower end of plunger rod 148 and bears against pressure member 144 for pivoting the pressure member toward guide member 138 when button 146 and plunger rod 148 are depressed. A split ring 153 is provided on rod 148 as a stop for limiting the downward movement of the rod to prevent undue pressure from being applied to the container. The pressure applied to the container is limited by the resilience of spring arm 152 and this, together with the stop, prevents the container from being compressed so that it might break when withdrawal is attempted. A spring 154 is provided for biasing the push button and plunger arm outwardly.

The photosensitive and print-receiving sheets comprising the sandwich formed by pressure-applying rolls 124 and 126, are required to remain in superposition during a predetermined imbibition (processing) period, during which the sandwich is retained in the dark and at the end of which the sandwich may be moved into the light and the sheets separated. The apparatus includes means for transporting the sandwich through the housing within a light-tight environment and then guiding the sandwich from the housing through withdrawal opening 36. This means comprises a pair of rolls 156 and 158 mounted in juxtaposition within the housing adjacent and in closing relation to withdrawal opening 36. Both of rolls 156 and 158 preferably comprise surface layers of a compliant material having a high coefficient of friction, rubber being desirable for this purpose. Roll 158 is mounted for rotation on lower chassis 50 closely adjacent forward end wall 38. Roll 156 is mounted for rotary movement at its ends on arms 160, in turn pivotally mounted on intermediate chassis 72. Torsion springs 162 are provided for biasing arms 160 so as to urge roll 156 toward and into engagement with roll 158 when the apparatus is in the operative position shown in FIG. 3. Mounting of roll 156 on intermediate chassis 72 permits roll 156 to be spaced apart from roll 158 when the apparatus is in the open position shown in FIG. 4, thereby permitting the photosensitive and second sheets to be threaded between pressure-applying rolls 124 and 126 and between rolls 156 and 158. Tabs 164 are provided on the lower portion of arms 74 of intermediate chassis 72 for engaging arms 160 and acting as a stop for pivotal movement of arms 160 when the intermediate chassis is pivoted to an open position.

The document copying apparatus of the invention is intended, as previously noted, to be manually operated and, in the form shown in FIGS. 1 through 8, is operated by grasping and pulling on a portion of the sandwich comprising the photosensitive and second sheets projecting from the housing through withdrawal passage 36. To operate the apparatus to make a copy, the operator introduces a container 130 into the housing through opening 136, depresses button 146 and holds the button depressed while withdrawing the container from the housing. This provides an elongated mass of fluid on the portion of the photosensitive sheet extending between guide roll 102 and pressure-applying rolls 124 and 126; thereupon the operator introduces an original 106 into passage 20 until the leading end of the original is at the bite of inlet feed rolls 108, whereupon the operator grasps the end portions of the photosensitive and second sheets extending through passage 36 and pulls the photosensitive and image-receiving sheets to advance them through the apparatus. It is during this advancement that the original is fed into superposition with the photosensitive sheet between the latter and tube 98, the photosensitive sheet is exposed and the exposed area of the photosensitive sheet is advanced in superposition with an area of the image-receiving sheet between the pressure-applying rolls to distribute the fluid and form a sandwich which is advanced from the pressure-applying rolls to rolls 156 and 158 and thence from the apparatus through withdrawal passage 36. The apparatus includes a transmission driven by frictional engagement of one of the sheets with one of the rolls and connected with the various components of the apparatus for effecting the introduction and ejection of the original and the exposure of the photosensitive sheet. In the form shown in FIG. 8, the transmission is driven by frictional engagement of the photosensitive sheet with roll 158, and comprises a sequence of engaged torque transmitting members such as toothed or friction gears, the latter being shown as the preferred form because many of the friction gears which are required to coact are on different chassis.

The transmission includes a first friction roll 166 keyed to the shaft on which roll 158 is mounted, and a second (idler) friction roll 168 mounted on side plate 56 of lower chassis 50 in frictional engagement with friction roll 166. Each of outlet feed rolls 112 is connected to a friction roll 170, the latter being frictionally engaged with one another and one of friction rolls 170 being frictionally engaged with second friction roll 168, the latter transmitting torque to friction roll 170 with which it is engaged for rotating the output feed rolls. Torque is transmitted to the inlet feed rolls 108 through an idler friction roll 172 engaged with one of friction rolls 170 and with one of a second pair of friction rolls 174 coupled with inlet feed rolls 108. Only one of outlet feed rolls 112 need be driven to feed the original from the apparatus when the leading edge of the original has been fed from the bite of tube 98 and guide roll 102 into the bite of the outlet feed rolls. The other friction roll 170 would then merely function as an idler for transmitting torque from the driving friction roll 170 to idler friction roll 172.

Figure 10:
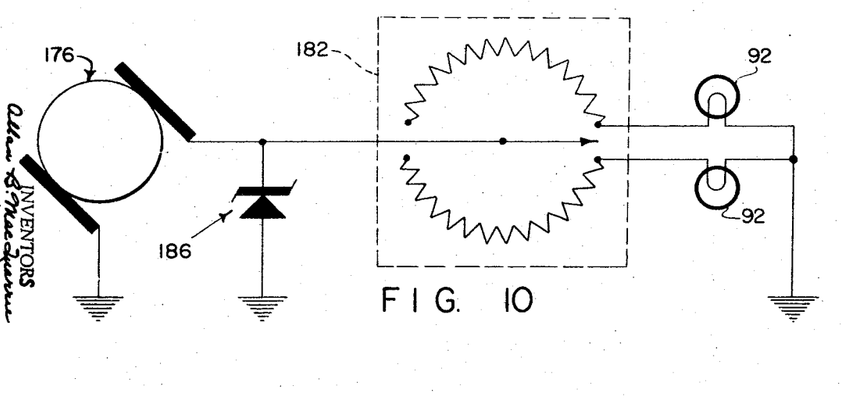
FIG. 10 is an electrical circuit diagram illustrating the electrical components of the invention.

As previously noted, the document copying apparatus of the invention is designed to be operated manually without the need for an outside source of electrical power; and power for the light sources, i.e., lamps 92, is supplied manually in conjunction with advancement and processing of the sheet materials. Current for the lamps is supplied by a direct or alternating current generator, designated 176, connected to the transmission through a friction drive roll 178 and an idler friction roll 180 keyed to the same shaft as idler friction roll 172. Generator 176 is shown as being mounted on upper wall 18 of the upper housing section intermediate inlet and exit passages 20 and 22. Reference is now made to FIG. 10 of the drawings for a circuit diagram showing the electrical connections between the generator and lamps 92 and one system for determining which of the two lamps is to be employed for exposure and the intensity of the lamp. One input terminal of the generator is grounded in the chassis and the other output terminal is connected to a rheostat 182 having separate windings each connected in series with one of lamps 92. The construction of the rheostat is such that only one of the windings is employed at any time so that only one of the lamps is illuminated. A control knob 184 is provided on the rheostat exterior of the housing so that the lamps may be employed selectively and the intensity thereof may be controlled.

Figure 11:
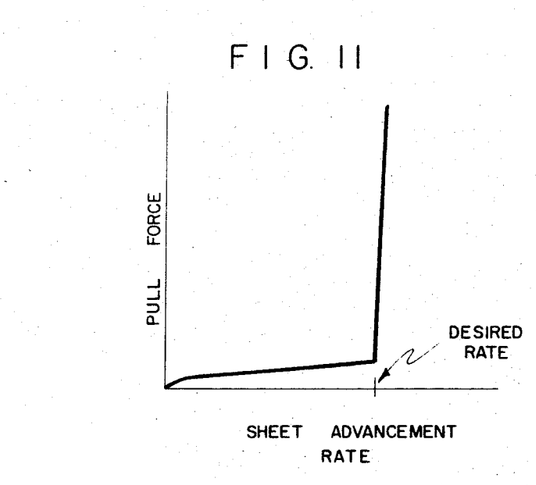
FIG. 11 is a graph illustrating the function of a governor in the document copier.
Figure 12:
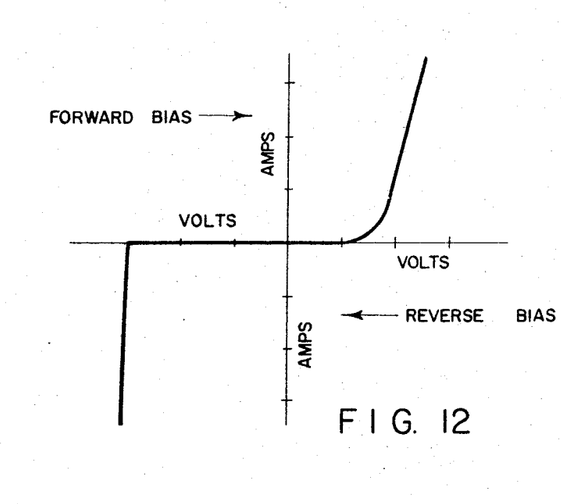
FIG. 12 is a graph illustrating the electrical characteristics of a Zener diode which render the Zener diode useful in the present invention.

The exposure of the photosensitive sheet and the duration of the processing of the photosensitive and image-receiving sheets is a function of the rate of advancement of the sheets through the apparatus, thereby making it essential that the rate of movement of the sheets through the apparatus must be controlled. According to the invention, the generator which supplies current for operating the lamps is designed to function as an electromagnetic governor in order to regulate its own speed and the speed of movement of the sheets through the apparatus. The governor, in this type of apparatus, should have the characteristics shown in FIG. 11 of the drawings, in which the sheet advancement rate is plotted against the pulling force which must be exerted on the sheets to advance them through the apparatus. It will be noted that the pull force increases only slightly until the desired rate of advancement of the sheets is reached, whereupon the force required to increase the rate of advancement of the sheets rapidly increases well out of proportion to the increase in the sheet advancement rate. This characteristic of the governor is very similar to the current-voltage characteristics of a Zener diode as shown in FIG. 12 in which the current conducted by a Zener diode is plotted with respect to the bias on the Zener diode. It will be noted that with a reverse bias on the Zener diode, the diode acts as an almost infinite resistance conducting substantially no current until the reverse bias on the diode reaches a predetermined value termed the breakdown point. At this value, the Zener diode offers substantially no resistance to the flow of current so that the current flow increases well out of proportion to any increase in voltage.

The generator is caused to function as a governor by connecting a Zener diode, designated 186, across the output terminals of the generator in parallel with the lamps. The generator is of the conventional direct current type, having a voltage output which is directly proportional to the speed at which the generator is driven. The torque or power input to the generator is, of course, a function of the current output of the generator, which current output remains very small until the voltage impressed on the Zener diode reaches the breakdown voltage of the diode. Thus, the pull force which is exerted on the sheets in order to move the sheets through the apparatus and generate enough current to operate a lamp 92, is relatively small and remains constant until the speed of the generator is increased to the point where the voltage output of the generator is equal to the breakdown voltage of the Zener diode. When this speed is reached, the Zener diode becomes highly conductive, immediately placing a relatively large load on the generator and increasing, abruptly, the pull force required to increase the speed of the generator. At this point, increasing the speed of the generator and, hence, the sheet advancement rate, requires the exertion of a disproportionately greater force on the sheets, and in this manner the speed of the generator and rate of advancement of the sheets is regulated to the desired predetermined rate by the generator itself in cooperation with the Zener diode.

Figures 4, 13:
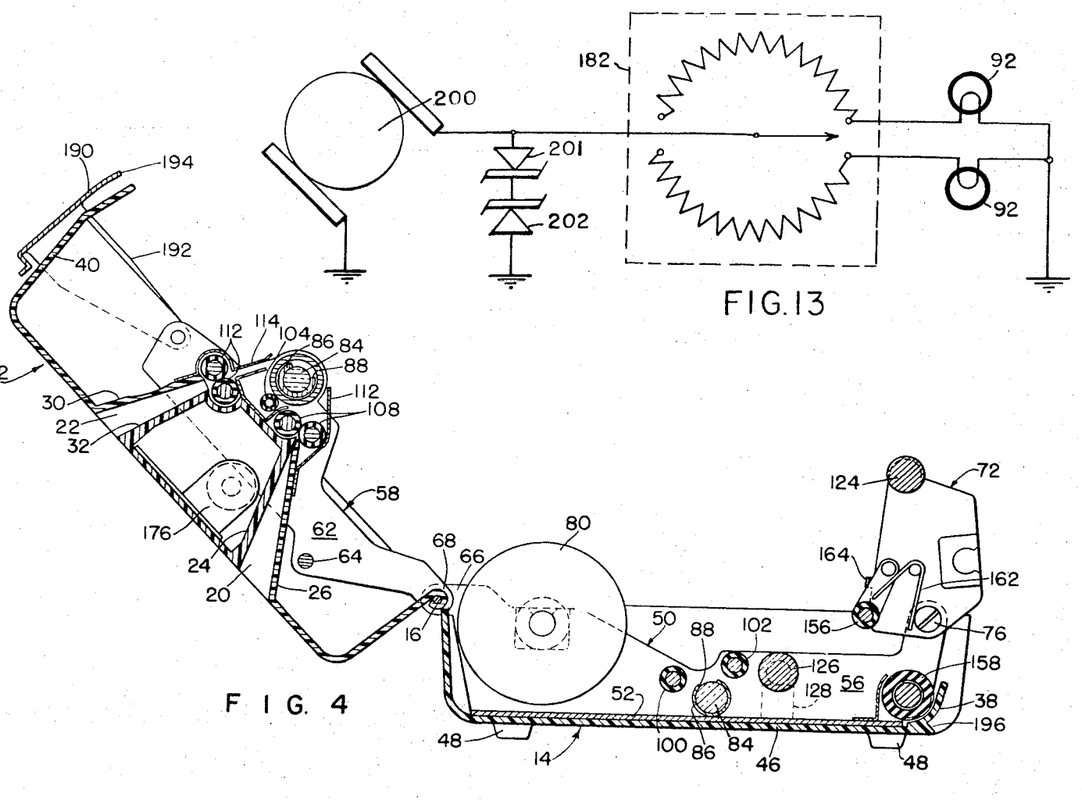
FIG. 4 is a view similar to FIG. 3 showing the components of the apparatus in an inoperative position in which the components are spaced apart to permit loading of sheet materials into the apparatus.
FIG. 13 is an electrical circuit diagram of an embodiment of the invention employing an alternating current generator.
Figure 5:
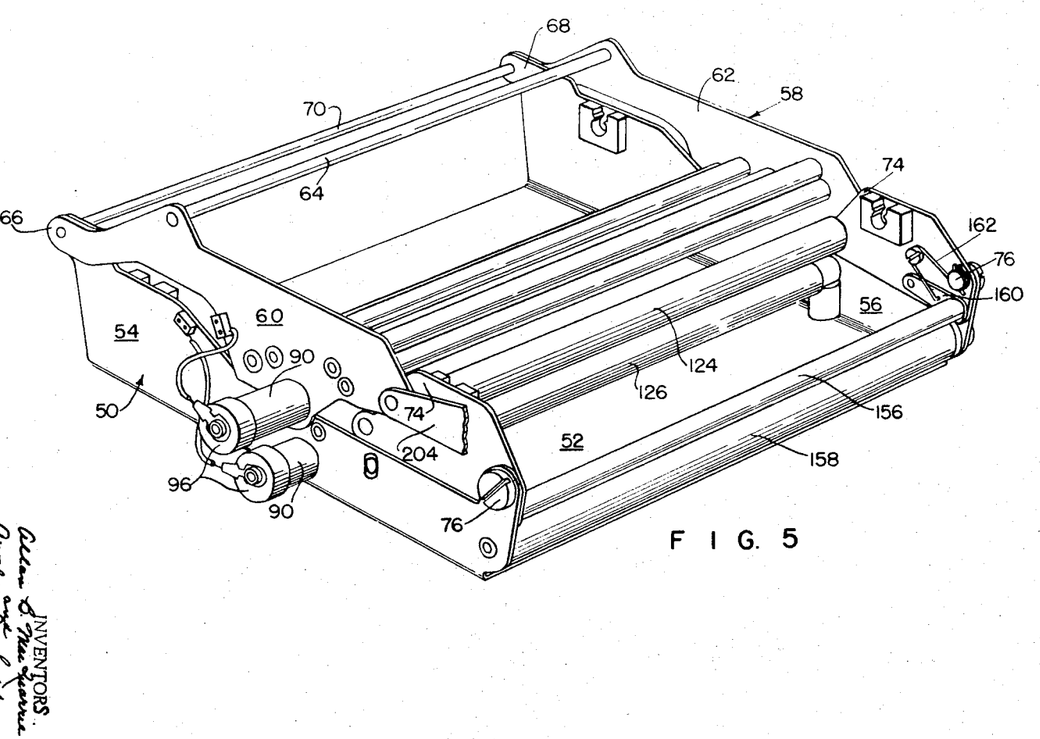
FIG. 5 is a perspective view of components of the apparatus shown with the outer housing removed.
Figure 6:
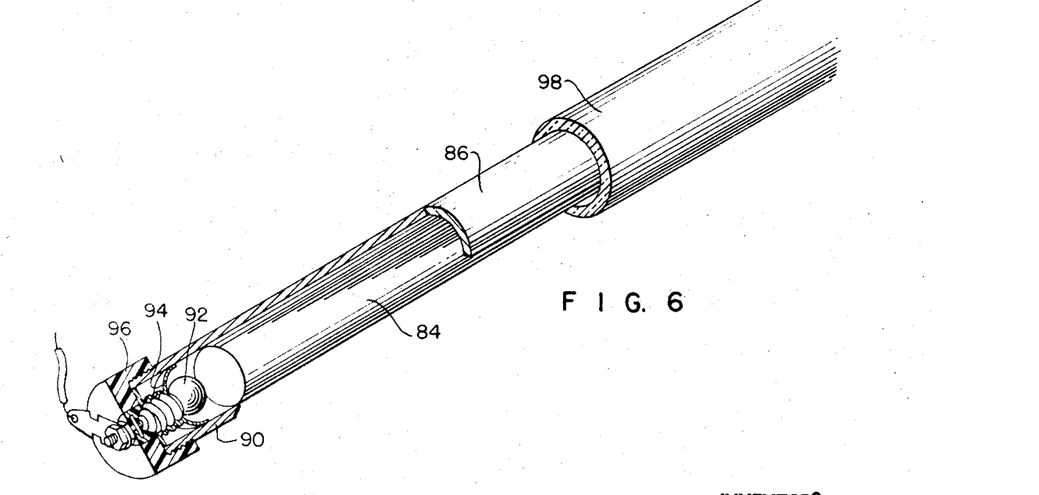
FIG. 6 is a fragmentary perspective view, partially in section, of a light source employed in the document copier.
Figure 7:
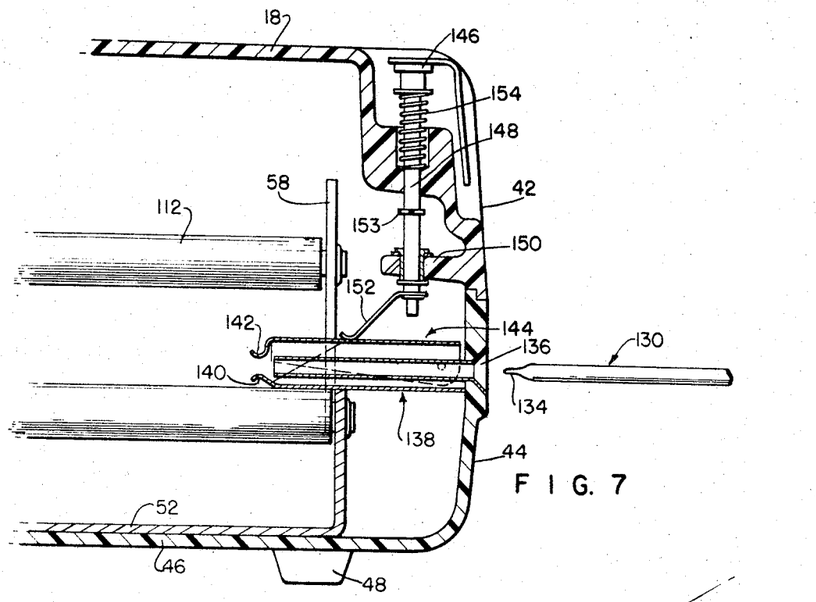
FIG. 7 is a sectional view taken substantially along the line 7—7 of FIG. 1.
Figures 8, 9:
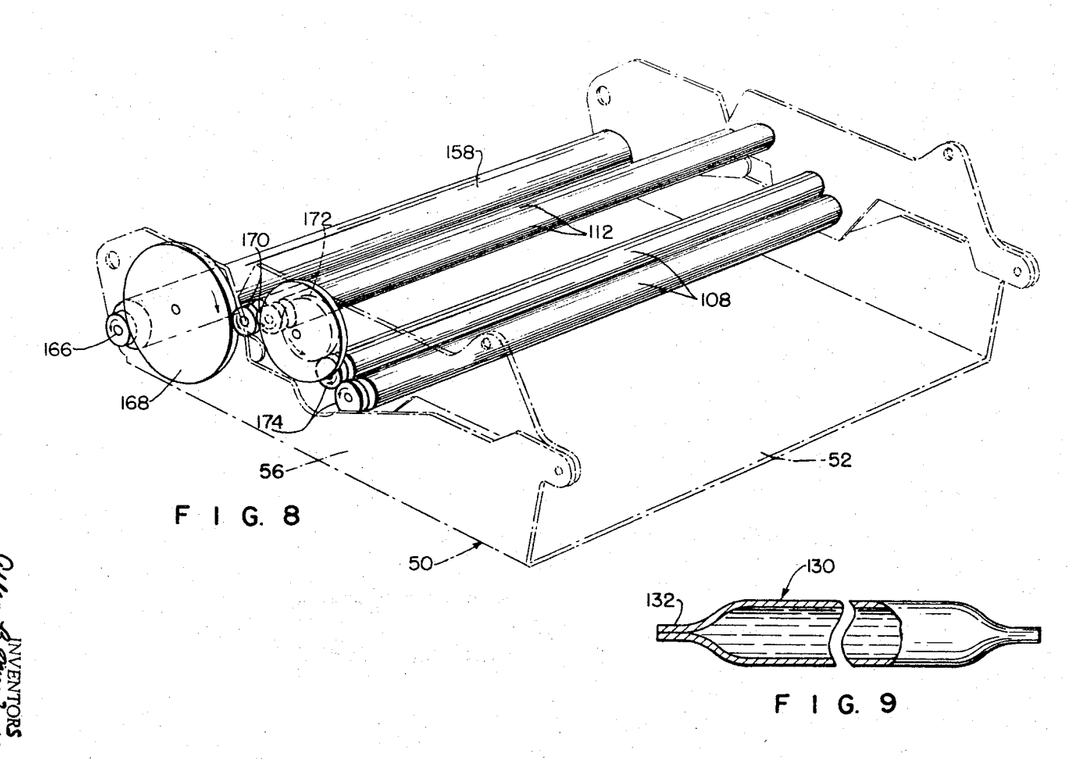
FIG. 8 is a view similar to FIG. 5 illustrating components of the apparatus.
FIG. 9 is a fragmentary view, partially in section, of a fluid container for introducing processing fluid into the apparatus.

While the apparatus has been shown as comprising a direct current generator, an alternating current generator 200, as shown in FIG. 13, may be employed as a governor in accordance with the invention. This would involve the use of two Zener diodes 201 and 202 connected in series and oppositely polarized from one another so that one of the diodes is always operating in the reverse direction regardless of the direction of current flow.

When making a copy of a document, the portion of the sandwich projecting from the apparatus through opening 36 is pulled until a predetermined length of the two sheets is advanced through the apparatus. This length is approximately equal to the length of the document being copied plus sufficient extra sheet material to advance the portion of the sandwich containing the copy completely from the apparatus through opening 36. A metering mechanism may be provided in the apparatus and coupled with the transmission for metering the length of the sheets advanced through the apparatus for each copy, or the sheet materials may be provided with some indicia visible to the operator to indicate when a sufficient length of the sheet materials has been withdrawn through the apparatus. The aforementioned extra length of sandwich is obviously at least equal to the sheet path length between guide roll 102 and opening 36 and this extra length of sandwich may, in one form of the apparatus, serve to trap and retain any excess processing fluid which is distributed between the sheets beyond the trailing edges of the exposed area of the photosensitive sheet and image-receiving area of the second sheet.

When a length of sandwich containing a copy of an original has been advanced from the apparatus through withdrawal opening 36, this length of sandwich is then severed in the region of the withdrawal opening from the portion of the sandwich remaining within the apparatus. Severance of the sandwich is accomplished with the aid of a cutter bar 190 mounted on arms 192 which are pivotally mounted on upper chassis 58. Arms 192 extend through slots in forward end wall 40 and cutter bar 190 is located exterior of the forward end wall and is pivotable from a position with its lower edge, designated 194, disposed adjacent and just above opening 36 to a second position with edge 194 disposed below opening 36 and abutting a shoulder 196 at the juncture of forward end wall 38 and bottom wall 46. Pivoting cutter bar 190 downward (in a clockwise direction viewing FIG. 3) causes a short section of the sandwich to be retained between the cutter bar and end wall 38, and this section of the sandwich functions as a leader which may be grasped after the sandwich has been severed therefrom by tearing the sandwich against edge 194 of the cutter bar which, incidentally, may be sharpened to facilitate this operation. A torsion spring (not shown) may be provided for urging the cutter bar counterclockwise (viewing FIG. 3) into the upper position shown in the drawings, at which position the operator may grasp the section of the sandwich extending through opening 36 for pulling the sheets through the apparatus to produce a copy of an original document.

The power input to the document copier of the invention is entirely manual and the input of power to the apparatus, instead of being applied directly to the photosensitive and second sheets by grasping the sheets, may be accomplished by the winding or tensioning of a conventional spring motor which would then serve to drive the transmission for advancing the photosensitive and image-receiving sheets through the apparatus, for feeding an original into and from the apparatus, and for operating the generator to supply current to the lamps. In another embodiment of the document copying apparatus shown in the aforementioned Land et al. application, a spring motor is incorporated for driving the apparatus. The overall construction and arrangement of the various components of this type of document copier are substantially the same as that previously described and shown, the differences residing primarily in the transmission and the cutter bar. The torque required for winding or tensioning the spring motor is tansmitted to the spring motor by way of the cutter bar, which is required to be manually actuated prior to the production of a copy.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In manually operated photographic copying apparatus including an electric lamp providing a source of illumination for exposing a photosensitive sheet and sheet engaging means in driving engagement with said sheet during movement thereof through said apparatus relative to said source of illumination for exposing said photosensitive sheet to light from said source, said manual operation providing the drive means for advancing said photosensitive sheet through said apparatus, comprising in combination:

an electric generator;

transmission means coupled with said sheet engaging means and said generator for operation of the generator thereby during advancement of said photosensitive sheet through said apparatus, said lamp being connected in series with the output of said generator, said generator being capable of developing an electrical potential which is proportional to the speed at which said generator is operated by said drive means; and a Zener diode connected across said generator output and in parallel with said lamp so as to provide a very high resistance to the flow of current when the potential across said generator is less than a predetermined voltage and offering a very low resistance to the flow of electrical current when the potential across said generator output is greater than said predetermined voltage, whereby said generator is caused to function as a governor offering very little resistance to the advancement of said sheet through said apparatus at a rate less than a predetermined rate and offering a very high resistance to the advancement of said sheet through said apparatus at a rate exceeding said predetermined rate.

2. The photographic apparatus of claim 1 wherein said generator is an alternating current generator and two oppositely biased Zener diodes are provided connected in series with one another across said generator output.

References Cited

UNITED STATES PATENTS 2,589,720  3/1952  McMath ________ 240—10.50 X
3,152,531  10/1964 Land et al. ____________ 95—75

OTHER REFERENCES

Motorola, Silicon Zener Diode and Rectifier Handbook, copyright 1961, pages 27, 112 and 113, cited. Copy in Group 211. Library No. TK 7872, S4M66, 1961, C.3.

JULIA E. COINER, *Primary Examiner.*